June 21, 1960 G. E. SLEEPER, JR 2,942,145

TRIGGERING MEANS FOR COLOR TELEVISION TUBE

Filed March 1, 1954 3 Sheets-Sheet 1

INVENTOR.
GEORGE E. SLEEPER JR.
BY Townsend, Townsend & Hoppe
ATTORNEYS

June 21, 1960 G. E. SLEEPER, JR 2,942,145

TRIGGERING MEANS FOR COLOR TELEVISION TUBE

Filed March 1, 1954 3 Sheets-Sheet 2

INVENTOR.
GEORGE E. SLEEPER JR.
BY
Townsend, Townsend & Hoppe
ATTORNEYS

TRIGGERING MEANS FOR COLOR TELEVISION TUBE

Filed March 1, 1954 3 Sheets-Sheet 3

INVENTOR.
GEORGE E. SLEEPER JR.
BY
Townsend, Townsend & Hoppe
ATTORNEYS

United States Patent Office
2,942,145
Patented June 21, 1960

2,942,145

TRIGGERING MEANS FOR COLOR TELEVISION TUBE

George E. Sleeper, Jr., 730 Grizzly Peak Blvd., Berkeley, Calif.

Filed Mar. 1, 1954, Ser. No. 413,154
7 Claims. (Cl. 315—12)

This invention relates to color television, and more particularly to an improved picture tube for providing reproduction of images in substantially their natural color.

It is generally accepted that the transmission of images in substantially their natural color requires that the image to be transmitted be divided, not only into its image elements, but also into selected component color images.

Heretofore, good results have been obtained through the use of two different types of systems. One employs separate channels to transmit the separate component color image representative signals. This system is popularly known as the "simultaneous" type system. Another system is generally known as the "sequential" type system. This system uses a single channel to transmit component color image signals sequentially. Neither system is acceptably compatible with black and white reproduction standards.

At the present time, therefore, the so-called compatible system of transmission has been adopted as standard for the United States. In the compatible system, color transmission is accomplished by reducing the three simultaneous image representative signals into two simultaneous signals. One signal supplies the brightness component and the other signal supplies the chroma component. The signal also includes a component providing additional synchronizing information and is ordinarily referred to as the "color burst." Prior to transmission over the air these several signals are combined into a composite signal. The composite signal includes the brightness component, the chroma component, and the synchronization or "color burst" signal.

The receiver adds the brightness component and the chroma component to reproduce the three simultaneous color image representative signals which are used for reproduction of the colored picture in the picture tube. Receivers adapted to reproduce such signals are well known in the art and are not described herein.

There are at present two common types of picture tubes adapted for use in such receivers. One is the "three-gun" tube in which the three primary color signals are reproduced simultaneously. The other is a "single gun" picture tube in which the color signals are changed by time delay circuits and used sequentially. The nature, construction and mode of operation of these tubes is well-known in the art and is not described in detail in this specification.

This invention relates specifically to an improved form of picture tube overcoming the well-known problems inherent in the manufacture, structure and operation of the existing tubes.

A primary object of this invention is to provide an improved picture tube utilizing secondary emission produced by the electron impact of a scanning beam to form a pulse for controlling the action of a circuit and the fluorescence of the tube.

Another object of this invention is to provide a color television picture tube having a far greater simplicity than has heretofore been known in the art.

The foregoing and further objects of the invention will become apparent to those skilled in the art by an understanding of the following specification and the accompanying claims.

Figures 1, 2, 3, 4:
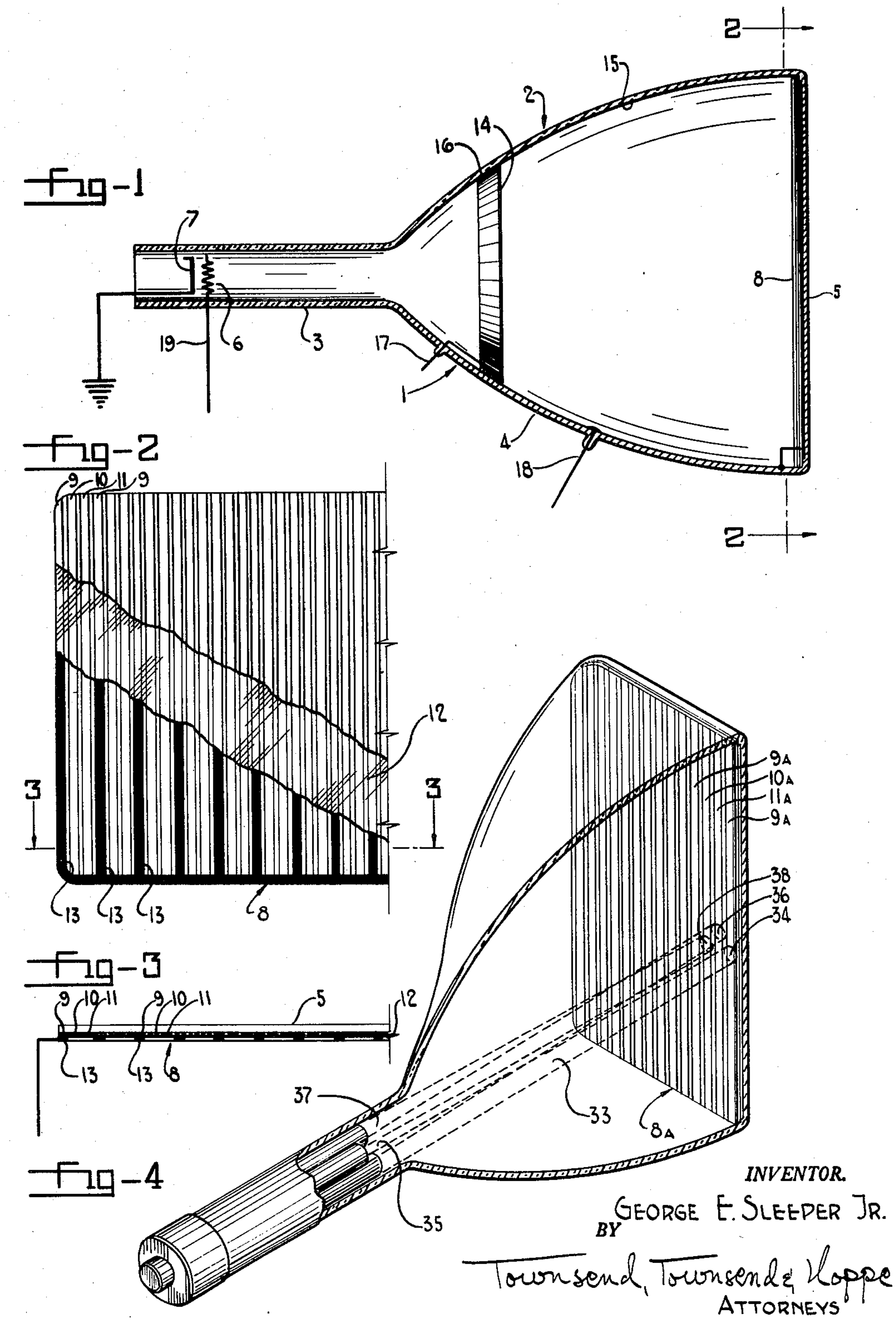
Fig. 1 is a schematic longitudinal sectional view through one embodiment of a tube utilizing the present invention in a "single gun" tube.
Fig. 2 is an interior elevational view of the image screen illustrated in Fig. 1 taken on the line 2—2 of Fig. 1, but showing the lines of the screen greatly enlarged.
Fig. 3 is a cross-sectional view of the image screen illustrated in Figs. 1 and 2 looking downwardly on the line 3—3 of Fig. 2.
Fig. 4 is a schematic longitudinal, sectional perspective view through another embodiment of a tube utilizing the present invention in a "three gun" tube.

One embodiment of the improved picture tube forming a part of this invention is illustrated in Fig. 1.

The tube 1 is a "single gun" picture tube (see Fig. 1) and it comprises an envelope 2 having a neck portion 3, a flaring bell portion 4 and a transparent face 5. A grid 6, a cathode 7 and the usual beam forming and deflecting arrangements customarily associated with television picture tubes are located in the neck portion 3 of the tube.

An image screen 8 is provided adjacent to or on the back of, the transparent face 5 of the tube. This image screen 8 (see Fig. 2) includes a repeating series of strip-like elements 9, 10 and 11 forming a built-up target area. The target elements of each series are of materials adapted to fluoresce upon electron impact in each of a predetermined number of component colors to provide additional color images. For example, each strip-like element of the series 9 is made of a material which fluoresces red, each strip-like element of the series 10 is made of a material which fluoresces blue, and each strip-like element of the series 11 is made of a material which fluoresces green.

The structure so far described is well known to the art, examples being found in United States Letters Patent No. 2,431,115, issued November 18, 1947, to A. N. Goldsmith, and United States Letters Patent No. 2,310,863, issued February 9, 1943, to H. W. Leverenz.

This invention is directed primarily toward the provision of a pulse-forming member consisting of a secondary emission producing means and secondary emission collecting means for controlling the time periods during which signals representative of the several component colors are applied to control the image reproduction.

By way of selected example, a nitro cellulose film 12

(see Fig. 3) is deposited evenly over the phosphors making up the strip-like elements 9, 10 and 11 comprising the image screen 8. Over this nitro cellulose film there is deposited a film of aluminum of minute thicknesss, say in the range of millionths of an inch—just thick enough to reflect the light produced by the phosphors, but thin enough to let the electrons pass through. This procedure is well-known to the art and is commonly known as "aluminizing." However, in the selected embodiment, this film of aluminum does not extend over the entire screen, but it is formed in a series of strips having exact registry with one of the repeating series of strip-like elements 9, 10 and 11 forming the built-up target area.

In the selected embodiment of this invention, this series of strips is shown in registry with the strip-like element 9 forming the red series of fluorescent phosphors.

Strips 13 produce secondary emissions each time the scanning beam passes over them. These emissions, as later shown in this specification, are collected and are used for the pulse-forming impulses. There are many materials which may be used for secondary emission. It will be observed that aluminum is selected, for example, for this secondary emission-producing element and that aluminum produces secondary emissions at a greater rate than those produced by glass and the usual phosphors used in color screens. Other equivalent materials may be used. Each time the electron beam passes an element 13, there is an increase in the rate of secondary emission. Means are provided to collect these secondary emissions after which they may be amplified and translated into operable pulses. In the selected embodiment the secondary emission-collecting means comprises an annular ring 14 (see Fig. 1) located in the flaring bell portion 4 of the tube. This annular ring 16 is preferably located out of the direct path of the scanning beam. The secondary emission-collecting means is insulated from the anode 15 of the tube by means of an insulating member 16.

The several strips 13 are connected together and are connected to the anode 15 of the tube.

A terminal 17 is connected to the collector 14 for electrically connecting the collector to an amplifying circuit. Similarly an anode terminal 18, a grid terminal 19 and the other requisite terminals are provided in the usual well-known manner.

Each time the scanning beam of the tube 1 traverses across a red aluminized strip section of the tube 1, the major part of the energy is converted into color energy and light in the phosphor, and the balance causes secondary emission. These secondary emissions in turn are collected by the collector 14 and they produce a pulse of current each time the scanning beam crosses a metalized stripe in the tube 1.

Collector 14 is maintained at a positive potential sufficiently high to attract the secondary emissions from the metallic strips associated with the red color sections, but insufficiently high to deflect the scanning beam within the tube 1. A positive potential of approximately 300 volts more than the anode voltage produces this result.

The signal pulse voltage developed across the resistor 20 by the secondary emission current from collector 14 is applied from terminal 17 through condenser 21 to a pulse-shaping, or clipper, amplifier 22 and may be handled in the same manner as the pulses illustrated and described in the P. K. Weimer Patent 2,545,325.

After the signal has been suitably amplified and shaped in the amplifier clipper, it is applied to signal switches for operating the control grid of the picture tube to gate the proper color video signal in time with the travel of the electron beam. Any of several well-known means may be used. For example, the manner illustrated and described in the P. K. Weimer Patent No. 2,545,325.

In such a system, pulse delay means 23, 24 and 25 are provided to delay the pulse for controlling each of the three video signals. These means may take any of the well-known forms, such as, for example, the pulse delay arrangement suggested in the article entitled "Video Delay Lines," appearing in "Proceedings of the Institute of Radio Engineers," for 1947 beginning at page 1580.

Pulse amplifiers 26, 27 and 28 are provided to control switches or "gates" 29, 30 and 31, so that at any one time only one of the component color video signals is passed to the grid 6 of projection tube 1.

Although not shown, the red, green and blue video signals may be obtained from any suitable color television signal receiver such as that shown and described, for example, in an article entitled "An Experimental Simultaneous Color Television System," appearing in "Proceedings of the Institute of Radio Engineers," beginning on page 861, for September 1947.

The switch 29 passes the red signal to grid 6 during the interval of time that the scanning beam of projection tube 1 passes the red section 9 to produce a spot of light in the red section of screen 8. Likewise, switch 30 is made operable to pass the green video signal during that time interval in which the spot caused by the scanning beam of projection tube 1 is traversing blue section 10 of the projection screen 8. Similarly, the green signal is passed through switch 31 to the control electrode 6 of the projection tube 1 during the time intervals that the spot is traversing the green sections 11 of screen 8.

It is important that the beam have sufficient threshold intensity to create secondary emissions at all times, but insufficient intensity to excite the phosphors unless there is a color signal impressed upon the beam.

The secondary emission producing means and the secondary emission collecting means just disclosed above and analogous circuit arrangements are equally adaptable for the so-called "three gun" tube. In such tubes one electron gun is used for exciting the red phosphors, a second for exciting the green phosphors and a third for exciting the blue phosphors. In the selected embodiment of this alternate form of the applicant's invention (see Fig. 4), the picture tube is unchanged with the exception of the substitution of three electron guns for the single electron gun disclosed and used in connection with the embodiment illustrated in Figs. 1, 2 and 3. During the operation of such a tube, the three electron beams are focused and aligned so that the red beam 33 (see Fig. 5) forms a spot 34 on the screen 8, the green beam 35 forms a spot 36 and the blue beam 37 forms a spot 38. In focussing and aligning the beams upon the screen 8*a* of the tube, the spot 34 produced by red beam 33 is arranged to precede the spots 36 and 38 in their normal travel across the face of the screen. In all other respects the screen, the secondary emission producing means and the secondary emission collecting means are unchanged.

Figure 10:
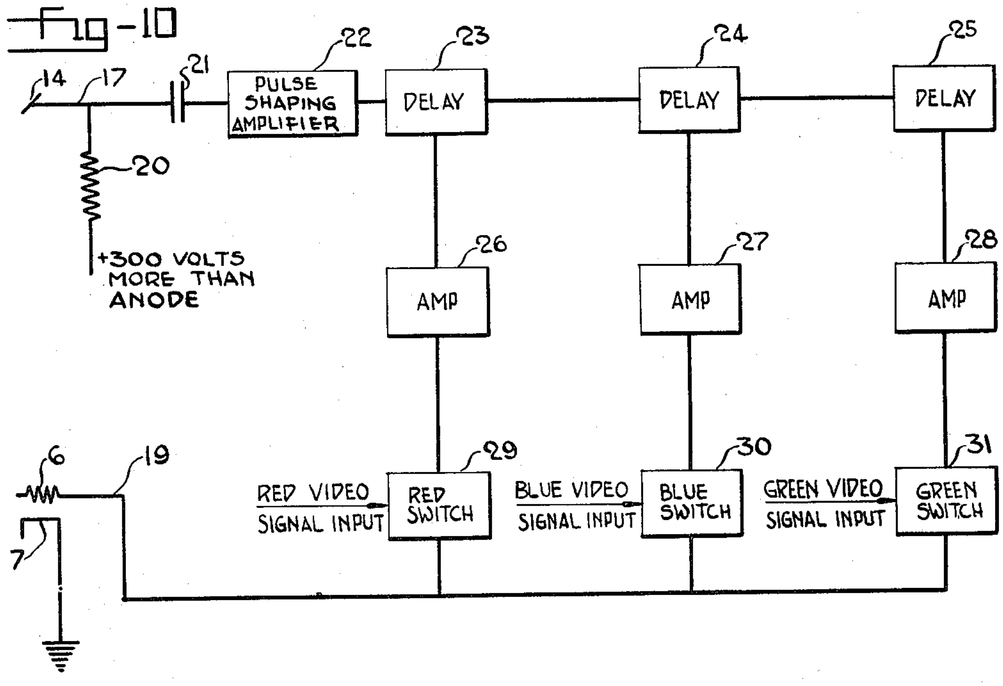
Fig. 10 is a schematic block diagram of circuit means which may be used with the "single gun" forms of tube using the present invention.
Figure 11:
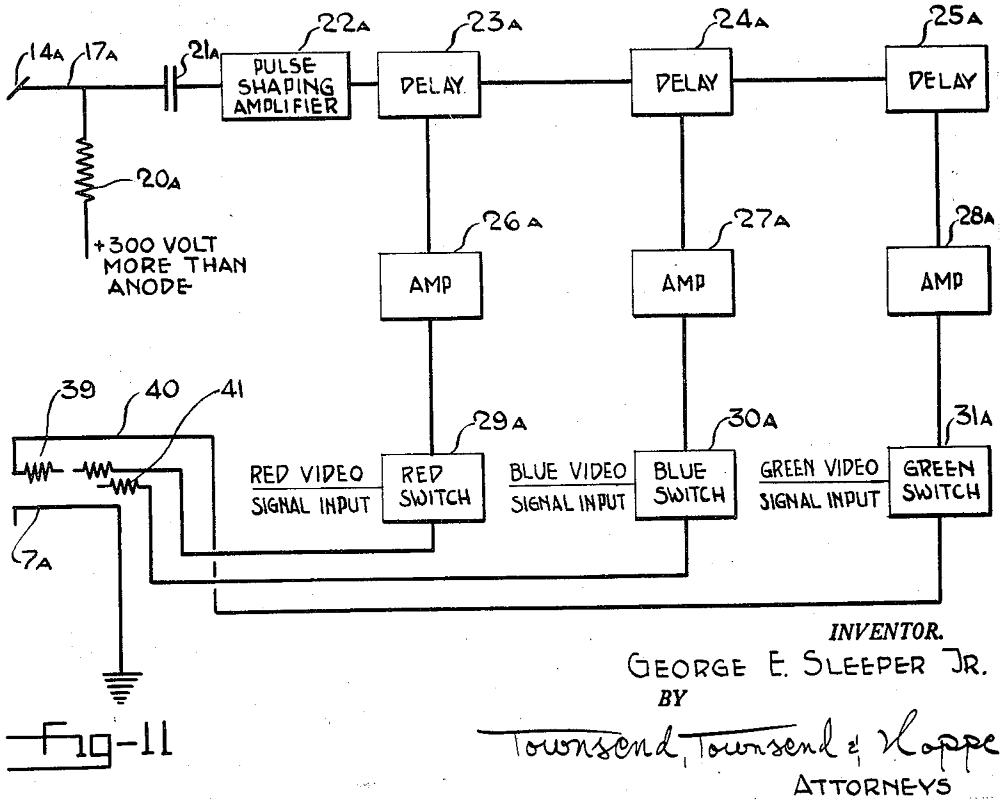
Fig. 11 is a schematic block diagram of circuit means which may be used with the "three gun" forms of tube using the present invention.

Turning to the suitable circuit for this arrangement (Fig. 11), the shaper or clipper amplifier delay means and switching means operate in the same manner as that depicted above. The circuit illustrated in Fig. 11 corresponds to that shown in Fig. 10 with the exception of suffixes (*a*) applied to the reference numerals.

The output from switch 29(*a*) is applied to the grid 39 supplying the signal for red beam 33. The output of switch 30(*a*) is applied to the grid 40 supplying the blue signal 38, and the output of the green switch 31(*a*) is applied to the grid 41 of the green gun forming the green spot 36.

Figures 5, 6, 7, 8, 9:
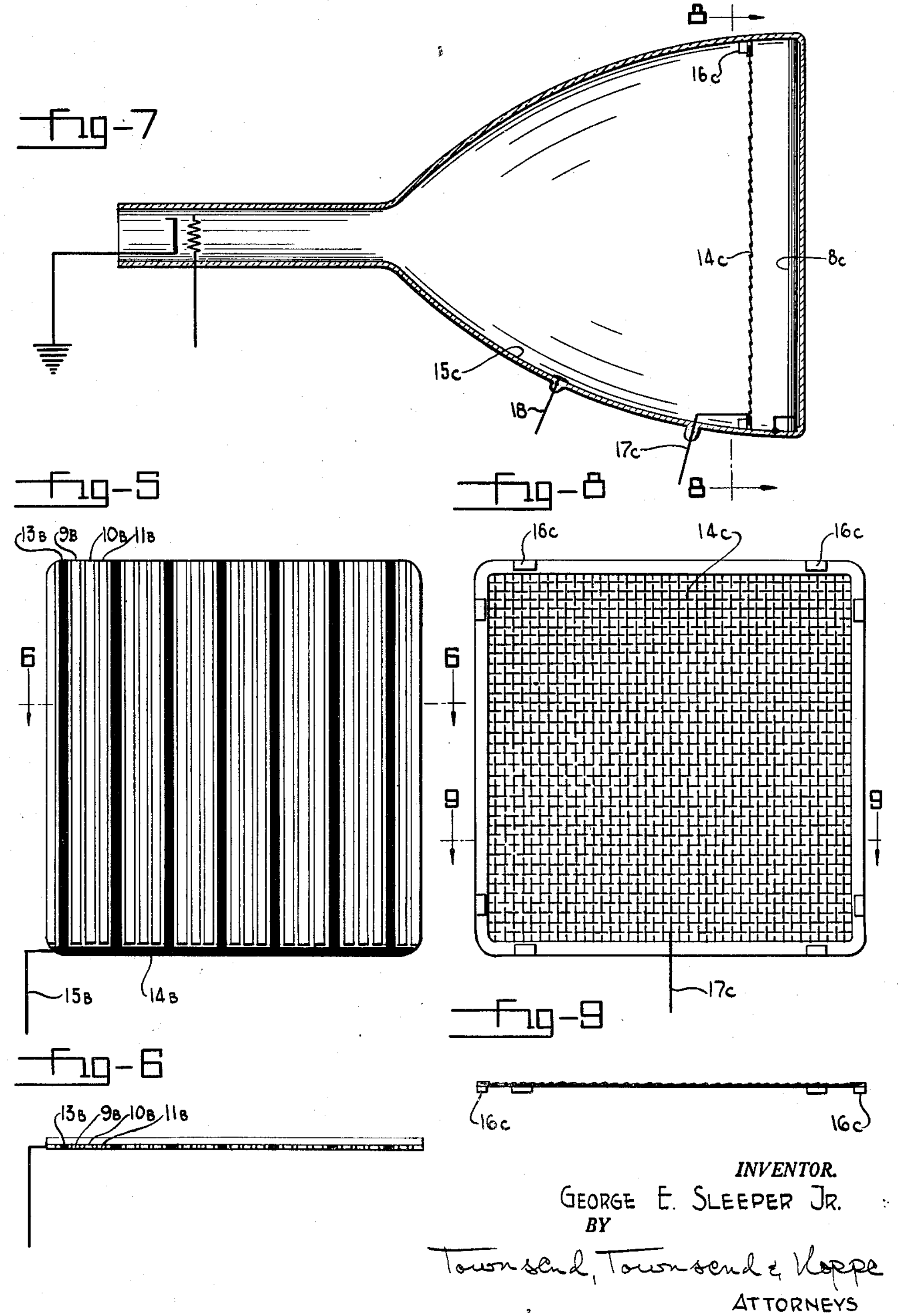
Fig. 5 is an interior elevational view of a form of image screen which may be used as an alternative for that shown in Fig. 2.
Fig. 6 is a cross-sectional view of the image screen illustrated in Fig. 5 looking downwardly on the lines 6—6 of Fig. 5.
Fig. 7 is a schematic longitudinal view through another embodiment of a tube utilizing the present invention.
Fig. 8 is an interior elevational view of a secondary emission collector illustrated in Fig. 7 taken on the line 8—8 of Fig. 7.
Fig. 9 is a cross-sectional view of the secondary emission collector illustrated in Figs. 7 and 8 looking downwardly on the line 9—9 of Fig. 8.

An alternative form of the screen in Fig. 1 is illustrated in Figs. 5 and 6. This screen operates in substantially the same manner as that illustrated in Fig. 1 with the exception that the secondary emission producing means is located between two adjacent series of color strips rather than in direct association with one series of such strips. In Fig. 6 the color elements 9(*b*), 10(*b*) and 11(*b*) correspond to the color elements 9, 10 and 11 illustrated in Figs. 2 and 3, and described earlier in this specification. In this embodiment, the secondary emission producing means comprises a film of aluminum which need be neither light-reflecting nor electron passing, and which is formed as a series of strips 13(*b*) aligned between each of the color elements 9(*b*) and 11(*b*). The several strips 13(*b*) are connected together and are connected to the anode 15(*b*) of the tube. Other than for these changes in structure, the mode of operation of this tube is the same as that depicted earlier in this application. This type of screen is equally applicable to the single and to the three gun tube.

An alternative form of electron collecting means is illustrated in Figs. 7, 8 and 9 wherein the elements containing the suffix (*c*) are identical to the corresponding elements in the prior embodiments of this invention. In this embodiment, however, the secondary electron collecting means 14 is replaced with secondary emission collecting means 14(*c*). The collector 14(*c*) comprises a wire mesh having a spacing of, say, one-half inch or greater between the meshes. This collector is placed inwardly from the color screen 8(*c*) of the tube so that the shadow which might otherwise be produced by the beam or beams passing through it will be out of focus on the screen. The collector 14(*c*) is insulated from the anode 15(*c*) by means of insulators 16(*c*) and is provided with a terminal 17(*c*) for connecting the collector to the circuit. This alternative may be used either with the single or the three gun tube and may be used in connection with either of the alternative forms of picture screen illustrated above.

Obviously this invention is not limited to the specific structure shown in the drawings and described in the specification, but it is capable of numerous other modifications and changes without departing from the spirit and scope thereof. Said invention should be limited by the scope of the appendant claims.

Having thus described my invention, what I claim as new and desire to secure by Letters Patent is:

1. A cathode ray tube for color television of the type having a cathode ray generating means and a translucent screen having a plurality of parallel color lines arranged in a repetitive series of lines having different color characteristics so as to be sequentially scanned by electrons eminating from the cathode ray generating means, the combination of; a layer of electron permeable material covering the face of said color lines facing the cathode ray generating means consisting solely of material having a rate of secondary emission less than the color lines and a plurality of conductive electron permeable light reflective lines arranged in parallelism with each other and with the color lines formed of material providing substantially more secondary emission when subjected to electron bombardment than the color lines, means for collecting the secondary emission produced by the impingement of electrons upon said conductive lines whereby an indexing pulse is formed to designate the relative location of the electrons with respect to the several color lines on the translucent screen, said conductive lines being positioned to provide secondary emission to produce an indexing pulse keyed to the color lines of one color in the repetitive series of color lines and to reflect light from latter color lines toward the viewing face of the cathode ray tube, and the cathode ray generating means comprising a plurality of electron guns each operative in association with the color lines of one color in the repetitive series of color lines to emit a greater flow of electrons during time intervals when the respective said guns are registered with the color line of the respective colors in the repetitive series of color lines.

2. In a cathode ray tube for color television of the type having cathode ray generating means and a translucent screen having a plurality of parallel luminescent color lines arranged to be sequentially scanned by electrons emanating from the cathode ray generating means, the combination of; a plurality of electron permeable lines arranged in parallelism with each other and the color lines, said electron permeable lines formed of material providing substantially more secondary emission when subjected to electron bombardment than the color lines; means for collecting the secondary emission produced by the impingement of electrons upon said electron permeable lines whereby an indexing pulse is formed to designate the relative location of the electrons with respect to the color lines in the translucent screen, said cathode ray generating means comprising a first cathode ray gun and a pair of second cathode ray guns, said first cathode ray gun constructed and arranged to produce first and second signals, said second cathode ray guns being constructed and arranged to produce a second signal, said first signal being disposed to cause said electron permeable lines to emit sufficient secondary emission to create an indexing pulse on the collecting means, and said second signals disposed to cause said color lines to illuminate.

3. A cathode ray tube according to claim 2 and wherein said first cathode ray gun is disposed to provide the first signal with a substantially predetermined lead over the second signal produced by said second cathode ray guns.

4. In a system of color television for reproducing a colored image from a plurality of different color signals the combination of a cathode ray tube including cathode ray generating means, a translucent screen having a plurality of parallel luminescent color lines arranged in a repetitive series of lines having a different color characteristic so as to be repetitively scanned by electrons from said cathode ray generating means, a plurality of electron permeable lines arranged in association with the color line of one color in said repetitive series of color lines and in parallelism therewith, said electron permeable lines formed of material providing substantially more secondary emission when subjected to electron bombardment than the color lines, means for collecting the secondary emission produced by the impingement of electrons upon said conductive lines whereby an indexing pulse is formed to designate the relative location of electrons with respect to the several color lines in said translucent screen, said electron permeable lines positioned to cause secondary emission therefrom to cause the indexing pulse to issue when said ray generating means impinges electrons on the lines of one color in said repetitive series of color lines, said cathode ray generating means comprising a plurality of electron beam signal generating guns comprising a first gun arranged to produce a first and second signal and a pair of second guns arranged to produce second signals, each gun arranged in operative association with the color lines of one color in the repetitive series of color lines wherein the second signal from each gun is responsive to the color signal representative of one color when the said gun is registered with the color line corresponding thereto, and said first signal is responsive to produce sufficient secondary emission from said conductive lines to form an indexing pulse to designate the relative locations of electrons with respect to the several color lines in said translucent screen, said first signal from said first gun being disposed to lead the second signals from said second guns a predetermined phase interval.

5. A cathode ray tube for color television including a translucent screen having a plurality of luminescent color lines arranged at right angles to the direction of scanning travel of a cathode ray in said tube; said parallel color lines comprising a repetitive series of lines having different color characteristics; a light reflective coating over only each of a first one color in said repetitive series of color lines; said coating producing secondary emission upon impingement of a cathode ray in said tube and having a rate of secondary emission greater than that of said color lines; and means in said tube for collecting secondary emission produced by the impingement of a cathode ray upon said reflective coating whereby a pulse is formed imparting the relative location of the cathode ray beam with respect to the first color lines in said translucent screen.

6. A cathode ray tube according to claim 5 and wherein said means for collecting secondary emission comprises a screen positioned in parallel alignment relative to said translucent screen.

7. In a cathode ray tube for color television of the type having cathode ray generating means and a translucent screen having a plurality of parallel luminescent color lines arranged to be sequentially scanned by electrons eminating from the cathode ray generating means, the combination of: an electron permeable light reflecting coating positioned over only all the color lines of a one color in said repetitive series of color lines; said coating formed of material providing substantially more secondary emission when subjected to electron bombardment than the color lines; means for collecting secondary emission produced by the impingement of electrons upon said coating whereby an indexing pulse is formed to designate the relative location of the electrons with respect to the color lines in the translucent screen.

References Cited in the file of this patent

UNITED STATES PATENTS

| | | |
|---|---|---|
| 2,545,325 | Weimer | Mar. 13, 1951 |
| 2,644,855 | Bradley | July 7, 1953 |
| 2,648,722 | Bradley | Aug. 11, 1953 |
| 2,667,534 | Creamer | Jan. 26, 1954 |
| 2,671,129 | Moore | Mar. 2, 1954 |
| 2,681,381 | Creamer | June 15, 1954 |
| 2,689,269 | Bradley | Sept. 14, 1954 |
| 2,689,927 | Bradley | Sept. 21, 1954 |
| 2,743,312 | Bingley | Apr. 24, 1956 |
| 2,791,626 | Hergenrother | May 7, 1957 |